(12) United States Patent
Chen et al.

(10) Patent No.: US 8,746,911 B2
(45) Date of Patent: Jun. 10, 2014

(54) BACKLIGHT MODULE AND LCD DEVICE COMPRISING BACKLIGHT MODULE

(75) Inventors: Shihhsiang Chen, Shenzhen (CN); Chong Huang, Shenzhen (CN); Quan Li, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 174 days.

(21) Appl. No.: 13/503,962

(22) PCT Filed: Feb. 27, 2012

(86) PCT No.: PCT/CN2012/071673
§ 371 (c)(1),
(2), (4) Date: Apr. 25, 2012

(87) PCT Pub. No.: WO2013/120281
PCT Pub. Date: Aug. 22, 2013

(65) Prior Publication Data
US 2013/0215601 A1 Aug. 22, 2013

(30) Foreign Application Priority Data
Feb. 16, 2012 (CN) .......................... 2012 1 0034828

(51) Int. Cl.
*G09F 13/04* (2006.01)
(52) U.S. Cl.
USPC .......................... 362/97.2; 362/97.1; 362/632
(58) Field of Classification Search
USPC ................................. 362/611–613, 600, 632
See application file for complete search history.

(56) References Cited

U.S. PATENT DOCUMENTS

| 8,210,718 B2 * | 7/2012 | Tsai et al. ................. 362/249.06 |
| 2007/0133222 A1 * | 6/2007 | Watanabe et al. ............. 362/561 |
| 2010/0106131 A1 * | 4/2010 | Klein et al. .................... 604/500 |

FOREIGN PATENT DOCUMENTS

| CN | 1837929 A | 9/2006 |
| CN | 201017144 Y | 2/2008 |
| CN | 201487705 U | 5/2010 |
| CN | 201535494 U | 7/2010 |
| CN | 202074348 U | 12/2011 |
| CN | 202082747 U | 12/2011 |
| JP | 2008165101 A | 7/2008 |

OTHER PUBLICATIONS

Du Naifeng, the first office action, Mar. 2013, CN.
Li Hui, the International Searching Authority written comments, Oct. 2012, CN.

* cited by examiner

*Primary Examiner* — Ali Alavi
(74) *Attorney, Agent, or Firm* — IPro, Inc.; Na Xu

(57) ABSTRACT

The invention discloses a backlight module and an LCD device including the backlight module. The backlight module includes a light source, an aluminum extrusion, and a backplane. The light source is fixed on the aluminum extrusion, and the aluminum extrusion and the backplane are integratedly joined. The aluminum extrusion heat dissipation is used by the backlight module of the LCD device of the invention, the aluminum extrusion and the backplane are integratedly joined, the contact area between the aluminum extrusion and air is increased, and thus high-efficiency heat dissipation is obtained.

13 Claims, 2 Drawing Sheets

BACKLIGHT MODULE AND LCD DEVICE COMPRISING BACKLIGHT MODULE

This application is a national stage of filing under section 371 of PCT/CN2012/071673 filed on Feb. 27, 2012, which claims priority to Chinse Patent Application No. 201210034828, filed Feb. 16, 2012.

TECHNICAL FIELD

The invention relates to the field of liquid crystal displays (LCDs), and more particularly to a backlight module and an LCD device comprising the backlight module.

BACKGROUND

An LCD device includes a display module which generally employs a backlight to provide a light source for displaying of images. Conventional backlight sources mainly include CCFL and LED. At present, as a novel light source, LED has the advantages of high brightness and low power consumption. Thus, the design of LED backlights is increasing and has become a trend in the future. However, LED generates high heat. To ensure the light-emitting efficiency and the service life of LED, it is necessary to improve the heat dissipation capacity of LED.

Now, heat dissipation mainly includes backplane heat dissipation and aluminum extrusion (aluminum extrusion type heat dissipation section) heat dissipation. The backplane heat dissipation requires the whole backplane to be made of aluminum or an aluminum alloy, resulting in high cost, which does not accord with the low-cost design requirement and thus is not widely used. As shown in FIG. 1, the aluminum extrusion heat dissipation refers to the manner that an LED light source 1 is fixed on an aluminum extrusion 2, and the aluminum extrusion 2 is mainly used for heat dissipation. The backplane can be made of SECC steel plates or plastic. However, with regard to the heat dissipation structure, the aluminum extrusion 2 is arranged inside the backplane 3, and the contact area between the aluminum extrusion and air is small, especially the contact area between the aluminum extrusion and the outside flowing air is small, thus, the heat dissipation efficiency cannot be increased.

SUMMARY

In view of the above-described problems, the aim of the invention is to provide a backlight module with high heat dissipation efficiency and an LCD device comprising the backlight module.

The purpose of the invention is achieved by the following technical scheme.

A backlight module comprises a light source, an aluminum extrusion, and a backplane; the light source is fixed on the aluminum extrusion, and the aluminum extrusion and the backplane are integratedly joined.

Preferably, the aluminum extrusion and the backplane are joined in an embedded mode.

Preferably, the cross section of the aluminum extrusion is in an L shape and comprises a vertical section and a lateral section; the light source is fixed on the vertical section of the aluminum extrusion, and the lateral section of the aluminum extrusion and the backplane are joined.

Preferably, the embedded length of the aluminum extrusion into the backplane is more than half of the length of the lateral section of the aluminum extrusion. Thus, the joining strength of the aluminum extrusion and the backplane is significantly strengthened, thereby guaranteeing that the structure of the whole backplane is not affected.

Preferably, the backplane is locked on the aluminum extrusion by a screw or a rivet.

Preferably, the lateral section of the aluminum extrusion is provided with a containing cavity, and the backplane is embedded in the containing cavity of the aluminum extrusion.

Preferably, the backplane is bent into a Z shape in the joining position, so that the difference between the outer surface of the backplane and the outer surface of the aluminum extrusion can be reduced, and even the outer surface of the backplane can be aligned with the outer surface of the aluminum extrusion. Thus, preferable appearance effect can be obtained. The backplane is aligned with the aluminum extrusion on the joined end surface, thereby increasing the joining strength.

Preferably, the backplane is provided with a containing cavity on the end surface joined with the aluminum extrusion, and the aluminum extrusion is embedded in the containing cavity of the backplane.

Preferably, the backplane is a plastic backplane, and the aluminum extrusion and the plastic backplane are integratedly injection molded.

Preferably, the aluminum extrusion is provided with an anti-disengaging structure for preventing the aluminum extrusion from disengaging from the plastic backplane. The anti-disengaging structure can significantly increase the joining strength of the aluminum extrusion and the plastic backplane.

Preferably, the anti-disengaging structure is a protrusion or a through hole on the part of the aluminum extrusion joined with plastic backplane.

Preferably, the aluminum extrusion is further provided with heat sinks to strengthen the heat dissipation effect.

The purpose of the invention is further achieved by the following technical scheme. An LCD device comprises a backlight module; the backlight module comprises a light source, an aluminum extrusion, and a backplane; the light source is fixed on the aluminum extrusion, and the aluminum extrusion and the backplane are integratedly joined.

Preferably, the aluminum extrusion and the backplane are joined in an embedded mode.

Preferably, the cross section of the aluminum extrusion is in an L shape and comprises a vertical section and a lateral section; the light source is fixed on the vertical section of the aluminum extrusion, and the lateral section of the aluminum extrusion and the backplane are joined.

Preferably, the embedded length of the aluminum extrusion into the backplane is more than half of the length of the lateral section of the aluminum extrusion.

Preferably, the lateral section of the aluminum extrusion is provided with a containing cavity, and the backplane is embedded in the containing cavity of the aluminum extrusion.

Preferably, the backplane is bent into a Z shape in the joining position.

Preferably, the backplane is provided with a containing cavity on the end surface joined with the aluminum extrusion, and the aluminum extrusion is embedded in the containing cavity of the backplane.

Preferably, the backplane is a plastic backplane, and the aluminum extrusion and the plastic backplane are integratedly injection molded.

Preferably, the aluminum extrusion is further provided with an anti-disengaging structure for preventing the aluminum extrusion from disengaging from the plastic backplane.

Preferably, the anti-disengaging structure is a protrusion or a through hole on the part of the aluminum extrusion joined with plastic backplane.

The invention has the advantage that the aluminum extrusion heat dissipation is used by the backlight module of the LCD device of the invention, the aluminum extrusion and the backplane are integratedly joined, the contact area between the aluminum extrusion and air is increased, and thus high-efficiency heat dissipation is obtained.

Wherein: 1. light source; 2. aluminum extrusion; 21. containing cavity; 22. protrusion; 23. through hole; 3. backplane; 31. containing cavity; 4. screw.

DETAILED DESCRIPTION

Figure 1:
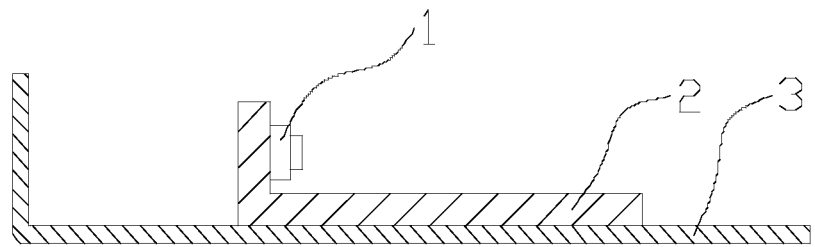
FIG. 1 is a schematic diagram of a backlight module using aluminum extrusion heat dissipation in the prior art.
Figure 2:
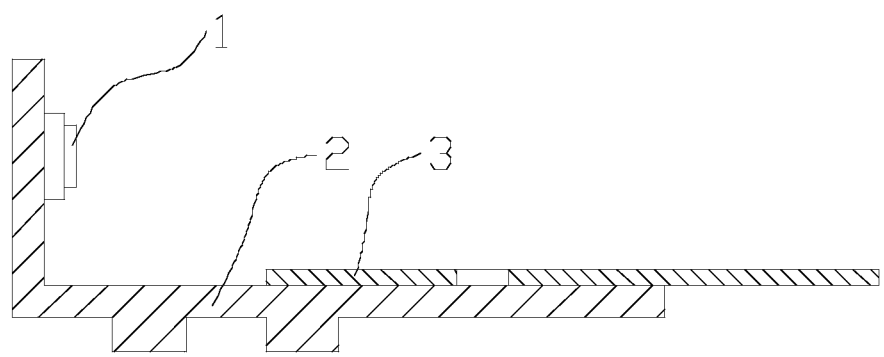
FIG. 2 is a structure diagram of a first example of a backlight module of the invention.

The invention provides an LCD device comprising a backlight module. FIG. 2 shows a first example of the backlight module. The backlight module comprises a light source 1, an aluminum extrusion 2, and a backplane 3; the light source 1 is fixed on the aluminum extrusion 2, and the aluminum extrusion 2 and the backplane 3 are integratedly joined.

The aluminum extrusion heat dissipation is used by the backlight module of the LCD device of the invention. The aluminum extrusion 2 and the backplane 3 are integratedly joined, and thus the contact area between the aluminum extrusion 2 and air (especially the outside flowing air) is increased, and high-efficiency heat dissipation is obtained. However, certain strength is required in the joining position of the aforementioned structure, otherwise strength problem is easy to occur in the whole backplane. As necessary, the aluminum extrusion 2 can be provided with heat sinks to strengthen the heat dissipation effect.

Figure 3:
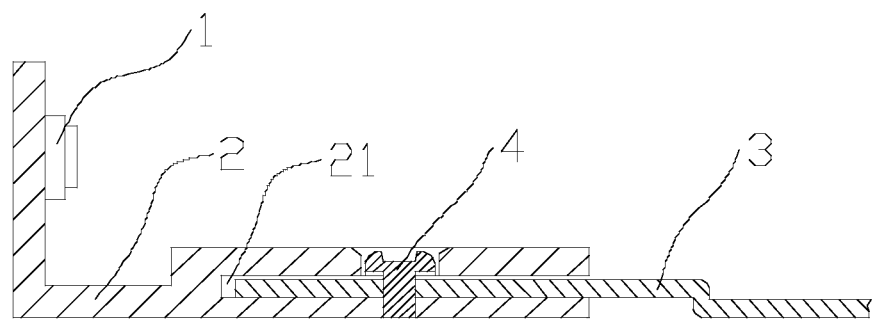
FIG. 3 is a structure diagram of a second example of a backlight module of the invention.
Figure 4:
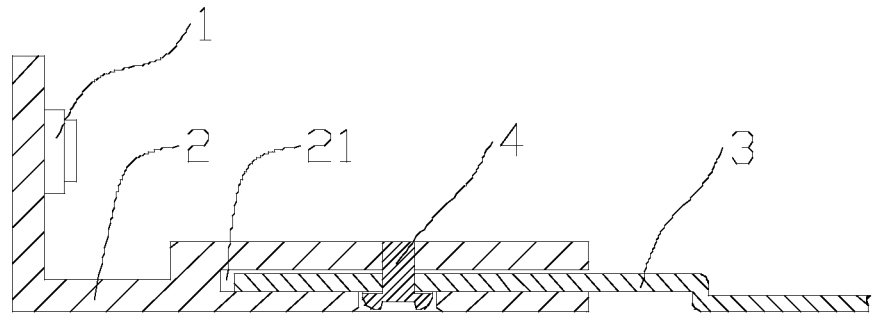
FIG. 4 is a structure diagram of a third example of a backlight module of the invention.

FIG. 3 and FIG. 4 show a second and a third example of the backlight module of the invention. The aluminum extrusion 2 and the backplane 3 are joined in an embedded mode. The cross section of the aluminum extrusion 2 is in an L shape and comprises a vertical section and a lateral section; the light source 1 is fixed on the vertical section of the aluminum extrusion 2, and the lateral section of the aluminum extrusion 2 and the backplane 3 are joined; the aluminum extrusion 2 is provided with a containing cavity 21, the backplane 3 is embedded in the containing cavity 21 of the aluminum extrusion 2, and the backplane 3 is locked on the aluminum extrusion 2 by a screw or a rivet.

When the embedded length of the aluminum extrusion 2 into the backplane 3 is more than half of the length of the lateral section of the aluminum extrusion 2, the joining strength of the aluminum extrusion 2 and the backplane 3 is significantly strengthened, and the structure of the whole backplane is not affected.

In the example, the backplane 3 is bent into a Z shape in the joining position, so that the difference between the outer surface of the backplane 3 and the outer surface of the aluminum extrusion 2 can be reduced, and even the outer surface of the backplane 3 can be aligned with the outer surface of the aluminum extrusion 2, thereby obtaining preferable appearance effect; the backplane 3 can be aligned with aluminum extrusion 2 on the joined end surface, thereby increasing the joining strength.

In FIG. 3, the screw 4 locks the backplane 3 from top to bottom; in FIG. 4, the screw 4 locks the backplane 3 from bottom to top, and can lock the backplane 3 in a complex direction in accordance with actual demand. The joining strength of the aluminum extrusion 2 and the backplane 3 is significantly strengthened, and the structure of the whole backplane is not affected.

Figure 5:
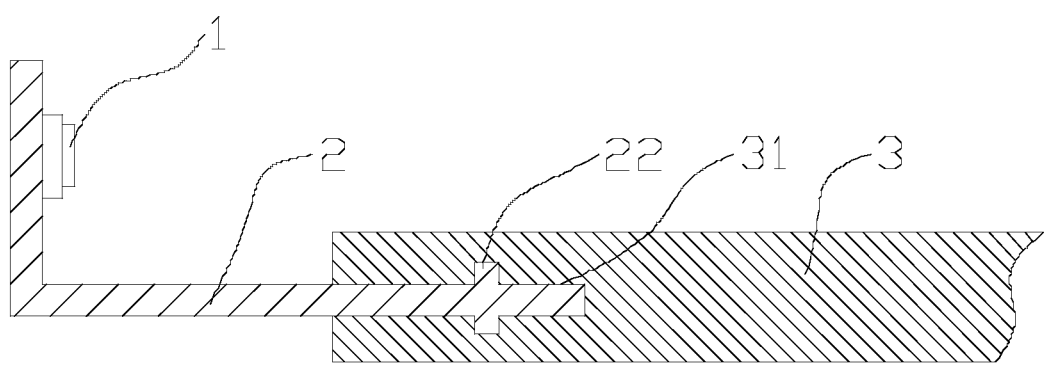
FIG. 5 is a structure diagram of a fourth example of a backlight module of the invention.

FIG. 5 shows a fourth example of a heat dissipation structure of the LED backlight of the invention. The backplane 3 is provided with a containing cavity 31 on the end surface joined with the aluminum extrusion 2, and the aluminum extrusion 2 is embedded in the containing cavity 31 of the backplane 3; the example has the beneficial effect which is substantially similar to that of the second example: the joining strength of the aluminum extrusion 2 and the backplane 3 is significantly strengthened, and the structure of the whole backplane is not affected.

In the example, the backplane 3 is a plastic backplane, and the aluminum extrusion 2 and the plastic backplane 3 are integratedly injection molded. The aluminum extrusion 2 is provided with an anti-disengaging structure for preventing the aluminum extrusion from disengaging from the plastic backplane. The anti-disengaging structure is a protrusion 22 on the part of the aluminum extrusion 2 joined with plastic backplane 3, and the protrusion 22 can significantly increase the joining strength of the aluminum extrusion 2 and the plastic backplane 3. In addition, the plastic backplane 3 and the aluminum extrusion 2 can be joined by the aforementioned screw or rivet.

Figure 6:
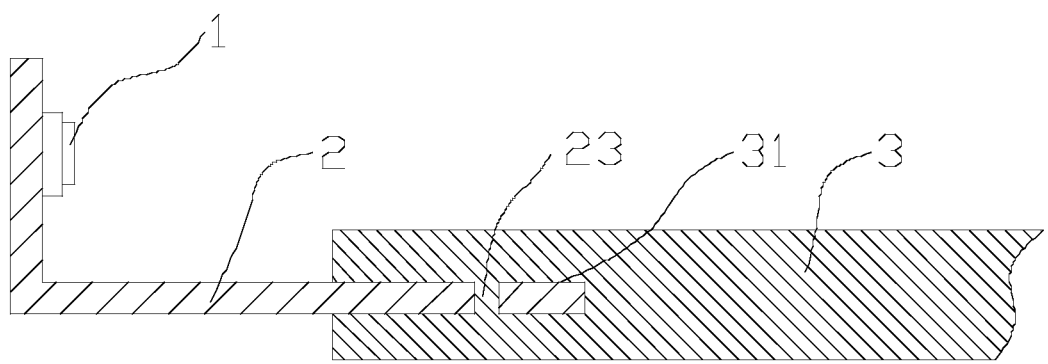
FIG. 6 is a structure diagram of a fifth example of a backlight module of the invention.

FIG. 6 shows a fifth example of a heat dissipation structure of the LED backlight of the invention. The example is different from the fourth example in that the anti-disengaging structure of the aluminum extrusion 2 is a through hole 23. When the aluminum extrusion 2 and the plastic backplane 3 are integratedly injection molded, part of material of the plastic backplane 3 flows into the through hole 23, and then the joining strength of the aluminum extrusion 2 and the backplane 3 is significantly strengthened.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

We claim:

1. A backlight module, comprising: a light source, an aluminum extrusion, and a backplane; said light source being fixed on said aluminum extrusion, and said aluminum extrusion and said backplane being integratedly joined, wherein said aluminum extrusion and said backplane are joined in an embedded mode; wherein a cross section of said aluminum extrusion is in an L shape and comprises a vertical section and a lateral section; said light source is fixed on the vertical section of said aluminum extrusion, and the lateral section of said aluminum extrusion and said backplane are joined; wherein the lateral section of said aluminum extrusion is provided with a containing cavity and the backplane is embedded in the containing cavity of said aluminum extrusion.

2. The backlight module of claim 1, wherein said backplane is locked on the aluminum extrusion by a screw or a rivet.

3. The backlight module of claim 1, wherein said backplane is bent into a Z shape in the joining position.

4. The backlight module of claim 1, wherein an embedded length of said aluminum extrusion into said backplane is more than half of a length of the lateral section of said aluminum extrusion.

5. The backlight module of claim 1, wherein said aluminum extrusion is provided with heat sinks.

6. An LCD device, comprising: a light source, an aluminum extrusion, and a backplane; said light source being fixed on said aluminum extrusion, and said aluminum extrusion and said backplane being integratedly joined, wherein said aluminum extrusion and said backplane are joined in an embedded mode; wherein a cross section of said aluminum extrusion is in an L shape and comprises a vertical section and a lateral section; said light source is fixed on the vertical section of said aluminum extrusion, and the lateral section of said aluminum extrusion and said backplane are joined; wherein the lateral section of said aluminum extrusion is provided with a containing cavity, and said backplane is embedded in the containing cavity of said aluminum extrusion.

7. The LCD device of claim 6, wherein an embedded length of said aluminum extrusion into said backplane is more than half of a length of the lateral section of said aluminum extrusion.

8. The LCD device of claim 6, wherein said backplane is bent into a Z shape in the joining position.

9. A backlight module, comprising: a light source, an aluminum extrusion, and a backplane; said light source being fixed on said aluminum extrusion, and said aluminum extrusion and said backplane being integratedly joined, wherein said aluminum extrusion and said backplane are joined in an embedded mode; wherein a cross section of said aluminum extrusion is in an L shape and comprises a vertical section and a lateral section; said light source is fixed on the vertical section of said aluminum extrusion, and the lateral section of said aluminum extrusion and said backplane are joined; wherein said backplane is provided with a containing cavity on an end surface joined with said aluminum extrusion, and said aluminum extrusion is embedded in the containing cavity of said backplane.

10. The backlight module of claim 9, wherein said backplane is a plastic backplane, and said aluminum extrusion and said plastic backplane are integratedly injection molded.

11. The backlight module of claim 10, wherein said aluminum extrusion is provided with an anti-disengaging structure for preventing said aluminum extrusion from disengaging from said plastic backplane.

12. The backlight module of claim 11, wherein said anti-disengaging structure is a protrusion or a through hole on the part of the aluminum extrusion joined with the plastic backplane.

13. The backlight module of claim 9, wherein said aluminum extrusion is provided with heat sinks.

* * * * *